US006504650B1

(12) United States Patent
Alfrey

(10) Patent No.: US 6,504,650 B1
(45) Date of Patent: Jan. 7, 2003

(54) OPTICAL TRANSFORMER AND SYSTEM USING SAME

(76) Inventor: Anthony J. Alfrey, 100 Redwood Ter., Woodside, CA (US) 94062-4545

( * ) Notice: Subject to any disclaimer, the term of this patent is extended or adjusted under 35 U.S.C. 154(b) by 0 days.

(21) Appl. No.: 09/691,748

(22) Filed: Oct. 18, 2000

Related U.S. Application Data

(60) Provisional application No. 60/160,261, filed on Oct. 19, 1999.

(51) Int. Cl.[7] ............................. G02B 27/10; G02B 5/08
(52) U.S. Cl. ...................... 359/627; 359/61.8; 359/850
(58) Field of Search ................................ 359/627, 618, 359/850, 851, 852; 385/33

(56) References Cited

U.S. PATENT DOCUMENTS

| 4,826,269 A | 5/1989 | Streifer et al. ............... 359/19 |
| 5,081,637 A | 1/1992 | Fan et al. ..................... 372/101 |

(List continued on next page.)

FOREIGN PATENT DOCUMENTS

| DE | 196 35 942 A1 | 9/1996 |
| DE | 197 15 807 C1 | 4/1997 |
| DE | 197 25 262 A1 | 6/1997 |
| WO | WO 98/47029 | 10/1998 |
| WO | WO 99/46627 | 9/1999 |

OTHER PUBLICATIONS

Friedhelm et al. *High–Brightness Fibre–Coupled Diode Laser Module* SPIE vol. 3285 0277–786X/98 pp. 192–198.
E. Wolak et al. *Novel High Brightness Diode Laser Source* Cleo 99 Monday Morning pp. 42–43.

*Primary Examiner*—Georgia Epps
*Assistant Examiner*—Saeed Seyrafi
(74) *Attorney, Agent, or Firm*—Mark A. Haynes; Haynes Beffel & Wolfeld LLP

(57) ABSTRACT

An optical system modifies the optical orientation of the individual sources of a laser diode array so that the illumination provided by said individual sources may be combined into a single target location, while providing illumination at said target with the brightness of the individual sources. A first set of uniformly-spaced parallel light beams, said parallel beams defining a horizontal plane, is repositioned into a second set of uniformly-spaced parallel light beams, also defining a second horizontal plane but propagating in a direction perpendicular to the original light beams, with said second horizontal plane offset from said first horizontal plane, while the relative orientation of the high-brightness and low-brightness axes of said light beams with respect to the horizontal is interchanged. Three transformers are used to accomplish this reorientation. The first of said transformers consists of a series of flat mirrors, placed parallel to each other and angularly oriented such that the optical beam from each of said sources is deflected into a angle determined by the relative position of said sources. The second transformer consists of a Fourier transform lens which projects a Fourier transformation of the angular and spatial distribution of light beams created by said first transformer, onto a third transformer. The third transformer consists of a mirrored optical device which can be made substantially identical to said first transformer, and which removes the angular displacement of said linearly-dispersed optical beams induced by said Fourier transform lens, resulting in a series of parallel light beams dispersed horizontally, with the high-brightness axis of the elliptical intensity profile of each said beam aligned coaxially. This distribution of light beams may then be focused into an optical fiber, laser gain medium or other device requiring the brightness-conserving coupling of individual optical sources into a single target location.

27 Claims, 15 Drawing Sheets

U.S. PATENT DOCUMENTS

| | | | |
|---|---|---|---|
| 5,168,401 A | 12/1992 | Endriz | 359/625 |
| 5,504,302 A | 4/1996 | Hentze et al. | 219/121.12 |
| 5,592,333 A | 1/1997 | Lewis | 359/628 |
| 5,808,323 A | 9/1998 | Spaeth et al. | 257/88 |
| 6,124,973 A * | 9/2000 | Du et al. | 359/618 |
| 6,212,011 B1 | 4/2001 | Lissotschenko et al. | 359/623 |
| 6,219,187 B1 * | 4/2001 | Hwu et al. | 359/627 |
| 6,231,198 B1 * | 5/2001 | Foo | 359/855 |
| 6,236,507 B1 * | 5/2001 | Hill et al. | 359/494 |
| 6,324,320 B1 * | 11/2001 | Goodman | 385/33 |
| 6,330,102 B1 * | 12/2001 | Daneman et al. | 359/290 |

* cited by examiner

OPTICAL TRANSFORMER AND SYSTEM USING SAME

RELATED APPLICATION DATA

The present application claims the benefit of, and incorporates by reference as if fully set forth herein, U.S. Provisional Application No. 60/160,261, entitled OPTICAL TRANSFORMER AND SYSTEM USING SAME, filed Oct. 19, 1999, invented by Anthony J. Alfrey.

BACKGROUND OF THE INVENTION

1. Field of the Invention

The present invention relates to optical systems and optical transformers, and more particularly to systems that re-orient axes of light beams, such as emitted by laser diodes, and combine the light beams in order to improve brightness of combined beams.

2. Description of Related Art

The light output from semiconductor diode lasers is often required to be focused into an optical fiber or similar small spot for applications including the optical pumping of solid-state laser crystals. For these applications and others, it may be desirable to combine the output beams from a plurality of diode lasers onto a single spot of dimensions similar to those obtained when focusing the light beam from a single diode laser. The ability to achieve this is limited by the so-called brightness of the laser diode source; for the purpose of this discussion, brightness refers to the amount of optical power emitted by a source per unit solid angle and per unit cross sectional area. It is well known from optical theory that, by combining the illumination from several individual and identical sources through the use of mirrors, lenses or other passive optical components, it is impossible to increase the brightness at a remote position beyond the brightness of an individual source. In practice, this optimal result is not achievable; the resultant remote illumination formed by the summation of light from the discrete sources is usually much less bright than any of the individual sources. The total optical power at the remote position may be nearly the sum of the individual sources, but the illumination may be spread out over a cross-sectional area much greater than the sum of the emitting areas or the light may be distributed into an excessively large solid angle. For example, the large angular distribution may preclude the coupling of the light from the combined sources into an optical fiber of small angular acceptance, even though the resultant source may be smaller in spatial extent than the input dimensions of the fiber.

The light emitted from a laser diode is characterized by having a brightness that varies greatly when measured in two distinct and perpendicular planes. Specifically, for a typical laser diode with an elliptically shaped output beam produced by an emitting region measuring several hundred microns by a few microns, and oriented such that the axis defining the wider dimension is aligned horizontally, the light emitted vertically may be considered to be many times brighter than that emitted in the horizontal direction. The concept of etendu, the product of the angular and spatial extent of a source in two perpendicular planes, and which is inversely proportional to brightness, is hereinafter used to describe the problem of optical beam combining. For purposes of illustration in FIG. 1, a system of coordinates 1 is defined, with the x-z plane arbitrarily defined as horizontal and the y direction defined as vertical, a typical laser diode 2 is considered, having an emission 3 with a height $\Delta y$ of 1 $\mu$m, with an angular divergence $\theta_{yz}$ of 65 degrees in the vertical direction, a width $\Delta x$ of 200 $\mu$m, and with an angular divergence $\theta xz$ of 14 degrees in the horizontal direction. With the definition of numerical aperture N.A.=sin (2 angular divergence), the etendu in the vertical direction is then the product of the vertical beam width and the vertical N.A. and is then 0.54 $\mu$m*N.A. Similarly, the etendu in the horizontal direction is 24 $\mu$m*N.A.

Since the angular divergence of the laser diode emission is substantially different in the x-z and y-z planes, the illumination profile, or spatial extent of the diode laser emission changes rapidly with distance from the emitting surface of the diode. Said profile, described by ellipses 4a–d, denotes the extent of the laser diode emission where the illumination intensity has fallen to a value of one half that at the location of peak intensity. Such elliptical profiles are used throughout the figures in the following descriptions of prior and subject art to denote the illumination profile of the diode laser beam as it progresses through various transforming components.

Fan (U.S. Pat. No. 5,081,637) has shown that a nearly optimal way to combine the light from discrete sources with radically different etendu in two perpendicular axes is to physically orient the diodes in such a way that the low etendu axes of the diodes are aligned to be collinear with respect to each other, with the high etendu axes aligned perpendicular to the common low etendu axis. This embodiment is described in FIGS. 2 and 3. In FIG. 2, the light from an individual source 2, propagating nominally in a z direction as defined by the coordinate axes 1, is first collimated in the low etendu direction by a simple cylindrical lens 5, forming a diode-lens combination 6. As shown by the elliptical intensity profiles 7a and 7b before and after the influence of the cylindrical lens 5, the effect of said lens is to substantially reduce the angular divergence of the diode laser beam in the y-z plane. In FIG. 3, a plurality of said diode-lens combinations 6a–c, three of which are shown, are then uniformly distributed and followed by an additional lens 8 that collects and focuses the light from the individual collimated sources to a remote image position 9. With high-quality collimating lenses and accurate positioning of the components, it is possible to achieve a brightness at the remote image position 9 nearly equal to that of an individual source 3a–c while simultaneously increasing the total optical power incident at the remote image position.

In the embodiment of Fan (U.S. Pat. No. 5,081,637), the emitting surfaces of the individual diodes are generally coplanar and the directions of light propagation from the multiple sources are essentially parallel, while in the technique described by Streifer (U.S. Pat. No. 4,826,269), the individual sources may be oriented as if on the surface of a cylinder, with the individual propagation directions aligned to be coplanar but generally pointing toward a common point of intersection.

The objective of the subject invention is the efficient combining of the illumination produced by the individual laser sources within a laser diode array. Laser diode arrays consist of a plurality of discrete laser diode sources fabricated onto a common semiconductor wafer, and said arrays are powerful sources of optical radiation. Each discrete diode source has an elliptical intensity profile as described earlier in FIG. 1, and the plurality of said sources is aligned such that the high etendu axes of all sources are collinear and their emitting faces are coplanar. Referring to FIG. 4, the array 10 has a light output with a very high etendu in the axis 11 common to all sources 12a–e and a low etendu in the y-direction perpendicular to said common axis. The centers of each source region may be separated by a distance w that varies between 1.5 and 5 times the width $\Delta x$ of a single source in the high etendu direction, and the array may consist of between 10 to 60 individual sources, distributed uniformly over a length of 0.5 to 2 centimeters. Because of the combined effects of the individual source spacings and orientations, the brightness of the array taken as a whole is much lower than the brightness of an individual source in the array. It is desired to combine the light from these discrete sources into a single spot, yet it can be see from the work of Fan (U.S. Pat. No. 5,081,637) that these individual sources are oriented improperly to allow for a straightforward combining of the light from the individual sources into a single spot while minimizing the etendu at the remote source. Specifically, the high-etendu axes 11 of the sources comprising the array are collinear, whereas the desired orientation is the collinear alignment of the low-etendu axes 13a–e. If the sources 12a–e comprising the array could be physically separated and rotated 90 degrees, the techniques of Fan (U.S. Pat. No. 5,081,637) could be utilized. Rather than an actual physical rotation of the individual sources, it is the objective of the subject invention to optically realign the light emitted from the individual sources to meet the criterion shown by Fan (U.S. Pat. No. 5,081,637) to allow for a combining of the optical output of the individual sources while maintaining high brightness of the remote source.

Several authors have described prior art to solve this problem. For example, the work of Endriz (U.S. Pat. No. 5,168,401) describes a technique utilizing a micro-optic element placed in front of each source to perform the aforementioned rotation, followed by appropriate focusing lenses. The disadvantage of the prior art of Endriz (U.S. Pat. No. 5,168,401) is the need for micro machined mirrored surfaces requiring special and expensive manufacturing techniques.

The subsequent work of Spaeth (U.S. Pat. No. 5,808,323) et al. describes how the individual sets of mirrors may be fabricated from identical and parallel mirror sheets, aligned and assembled with relatively inexpensive conventional optical assembly techniques. However, a disadvantage of the prior art of Spaeth (U.S. Pat. No. 5,808,323) is that, as the light from each source diverges in a plane common to all sources, some fraction of this light may strike the sides of the adjacent mirror plates, thereby scattering the light into a direction not recoverable and focusable, further resulting in said fraction of the optical power emitted by the laser array being lost.

The prior art of Lissotschenko (WO 99/46627) describes how the reorientation process may be achieved by a substantially different technique. This approach, which may be referred to as the Fourier transform technique, separates the reorientation process into several steps, each of said steps physically separated from another. Each step is characterized by a transformation between positional and angular information and the devices used at each step may be referred to as transformers. Referring to FIG. 5, the operation of this technique is illustrated by imposing a set of coordinate axes 1 onto the optical system, with the x axis aligned horizontally through the center of each emitting source, the z axis aligned parallel to the common propagation direction of the light from each source 14a–e and the y axis oriented vertically and perpendicular to the x and z axes. The optical sources 14a–e used with this technique are the individual laser diode sources within an array of multiple sources, with an additional arrangement of collimating lenses to reduce the horizontal and vertical angular divergence of the light output of each of said individual sources, one of said lens/source combinations being shown in FIG. 2. These lensing components and individual laser sources are then ignored to simplify the figures. However, it is noted that, while the collimation of the illumination dispersed vertically is readily achieved with a single cylindrical element, the collimation of the illumination dispersed horizontally requires a separate lens for each diode laser within the plurality of diode lasers comprising the diode laser array.

Three basic transformations are combined to form the complete system of the Lissotschenko patent (WO 99/46627) and are schematically displayed in FIG. 5. The coordinate system 1 will be used as a reference for defining a given direction or orientation. For the purposes of illustration, 5 separate sources 14a–e are considered, although the number of sources is, in principal, only limited by the ability to fabricate appropriate optical components to process the illumination from said sources. The shape or transverse distribution of each light beam as it propagates through the optical system is denoted by a series of ellipses 15–18 centered along and placed perpendicular to the direction of propagation of the light from each source.

In the first transformation, the propagation directions 19a–e of the light from the sources are redirected upward or downward from the horizontal or x-z plane at an angle y whose tangent is directly proportional to the position of each source measured from the center of the array at x=0. Sources at x>0 are angularly directed increasingly upwards while sources at x<0 are angularly directed increasingly downwards. As an example, the emission from a source at the extreme left side of the array at a position x=−a is redirected downwards at an angle −γ while the light from a source at the extreme right side of the array at position x=+a is redirected upwards at an equal and opposite angle+γ.

The second transformation is equivalent to the well-known Fourier transform which maps a distribution of angular deviations in the vertical direction to a distribution of spatial positions also in the vertical direction. Similarly, the Fourier transform maps the input spatial distribution in the horizontal direction to an output angular distribution in the horizontal direction. Therefore, the light from a source 14a at x=−a is repositioned to a location (x,y)=0,−b while the light from the source 14e at x=+a is repositioned to a location (x,y)=0,b. Similarly, the light from the source 14e now redirected to (x,y)=0,b propagates at an angle +β with respect to the y-z plane, while the light from the source 14a redirected to (x,y)=0,−b propagates at an equal and opposite angle −β with respect to the y-z plane. It can be appreciated that the sources 14a–e distributed along the x-direction at the first Transformation have been transformed to a set of virtual sources 17a–e distributed along the y direction at the third transformation.

Approaching the position of the third transformation, the light beams have undesirable angular displacements β in their respective propagation directions that increase with their distances above and below the x-z plane. A third transformation removes the undesirable angular deviation from each light beam, resulting in the illumination from all sources directed parallel to the z axis. Subsequently, the illumination from the multiple sources may be focused to a point 20 in the manner described by Fan (U.S. Pat. No. 5,081,637) by using a single spherical lens or some combination of spherical and cylindrical lenses.

Next, the transformers responsible for the aforementioned first, second and third transformations are described in FIG. 6. In the prior art of Lissotschenko (WO 99/46627), the first transformer 21 is a refractive element with a first planar input surface 21a and a second opposing output surface 21b which makes an angle φ with said input surface. Further, the first transformer is constructed so that said angle separating the first input surface and second output surface changes continuously with position x progressing from one end of the diode array to the other. The shape of the second surface 21b may be said to have the shape of a twisted ribbon or propeller.

Referring to FIG. 7, to achieve the desired transformation properties described earlier and to achieve the final optical reorientation of the sources as described by Fan (U.S. Pat. No. 5,081,637), it is required that the horizontal extent t of the optical illumination at the first transformer not be an appreciable fraction of the spacing w between the centers of said sources. It can be seen that, in the invention of Lissotschenko (WO 99/46627), an undesirable rotation $\Sigma$ is induced in the orientation of the high-etendu axis at the first transformer, caused by the continuous change in angle between said first surface 21a and said second surface 21b of the first transformer 21. Since in actual practice, the space 22 between the optical source and the first transformer 21 is often occupied by one or more optical elements intended to collimate the illumination in the vertical direction, the horizontal extent of the light has often expanded to an undesirable size at first transformer. When taken in combination with the induced rotation $\Sigma$ in the spatial illumination profile, this causes a diminishment in the efficient eventual recombination of the light from the individual sources. Further, fabrication of the twisted surface 21b of said first transformer requires sophisticated optical fabrication techniques, such as those described in the prior art of Lissotschenko (WO99/46627), not commonly used in conventional optical fabrication facilities.

Returning again to FIG. 6, it can be seen that the second transformer 23, a conventional plano-convex, bi-convex or Fresnel lens, is positioned such that the first transformer and third transformer are placed one focal length f away and on opposite sides of said lens, as is well-know within the art, thereby performing the Fourier Transform described earlier.

The third transformer 24 as described by Lissotschenko (WO 99/46627) consists of a first input surface 24a, followed by a series of second refractive surfaces disposed along the x axis, only one of which 24b is shown in FIG. 6, each being of a width 25 equal to a small portion of the total width of the third transformer, and with each of these individual second vertically aligned surfaces oriented at an angle $\mu$ with respect to said first input surface. Further, the angle $\mu$ subtended between said first and second surfaces varies continuously with position in the y or vertical direction so as to enable the previously-described third Transformation of the incident optical beams. While it is desirable that said second surface be smooth and continuous across the full extent of the illumination incident along the x direction on said third transformer, the micromachining techniques required for the construction of the transformer with the embodiment of Lissotschenko (WO 99/46627) precludes the fabrication of surfaces with large changes in thickness. It is because of these limitations that the embodiment of Lissotschenko (WO 99/46627) requires that the third transformer take on the configuration of a series of segments or narrow stripes aligned side to side, each being of the shape described in FIG. 6. This segmentation of the second surface can result in increased scatter and optical losses.

It is an objective of the subject invention to perform the above described optical transformations without the need for expensive fabrication techniques such as those described in the inventions of Endriz (U.S. Pat. No. 5,168,401) or Lissotschenko (WO 99/46627).

It is a second objective of the subject invention to achieve the transformational properties of the optical devices described in the prior art by using conventional optical fabrication techniques as are commonly applied to the fabrication of flat, polished optical surfaces.

It is yet another objective of the subject invention to reduce the optical loss incurred in performing the optical reorientation as can occur in the step mirror embodiment of Spaeth (U.S. Pat. No. 5,808,323).

It is a further objective of the subject invention to describe a first transformer similar in function to that described in the embodiment of the Lissotschenko (WO 99/46627) that does not induce the adverse effect of optical rotation of the elliptical intensity profile about the direction of propagation.

It is yet another objective of the subject invention to describe an embodiment in which said first and third transformers are substantially identical.

It is yet another objective of the subject invention to describe a third transformer with a second surface that is smooth and continuous across the incident illumination originating from a given source.

SUMMARY OF THE INVENTION

The subject invention provides for an optical system for modifying the optical orientation of the individual sources of a laser diode array so that the illumination provided by said individual sources may be combined into a single target location in such a way as to substantially provide an illumination at said target with the brightness of the individual sources. To achieve this end, three optical devices, hereinafter referred to as optical transformers, provide for the angular and spatial repositioning of the light beams from said individual sources in a way that allows a subsequent lens or combination of lenses to focus the light from said repositioned beams to said single target. Specifically, a first set of uniformly-spaced parallel light beams, said parallel beams defining a horizontal plane, is repositioned into a second set of uniformly-spaced parallel light beams, also defining a second horizontal plane but propagating in a direction perpendicular to the original light beams, with said second horizontal plane offset from said first horizontal plane, while the relative orientation of the high-brightness and low-brightness axes of said light beams with respect to the horizontal is interchanged.

The first of said transformers consists of a series of identical and easily fabricated flat mirrors, placed parallel to each other and angularly oriented such that the optical beam from each of said sources is deflected into a uniquely determined angle measured with respect to a vertical plane aligned with the emitting faces of said sources, said angle determined by the relative position of said sources. The second transformer consists of a Fourier transform lens which projects a Fourier transformation of the angular and spatial distribution of light beams created by said first transformer, onto a third transformer. Said second transformer results in the spatial positioning of the optical beams according to their angular displacements set by the first transformer, while the angular displacements induced by said second transformer correspond to the spacing of said first set of uniformly-spaced parallel light beams.

The third transformer consists of a mirrored optical device which can be made substantially identical to said first transformer, and which removes the angular displacement of said linearly-dispersed optical beams induced by said Fourier transform lens, resulting in a series of parallel light beams dispersed horizontally, with the high-brightness axis of the elliptical intensity profile of each said beam aligned coaxially. This distribution of light beams may then be focused into an optical fiber, laser gain medium or other device requiring the brightness-conserving coupling of individual optical sources into a single target location.

DETAILED DESCRIPTION OF THE PREFERRED EMBODIMENT

Figure 9:
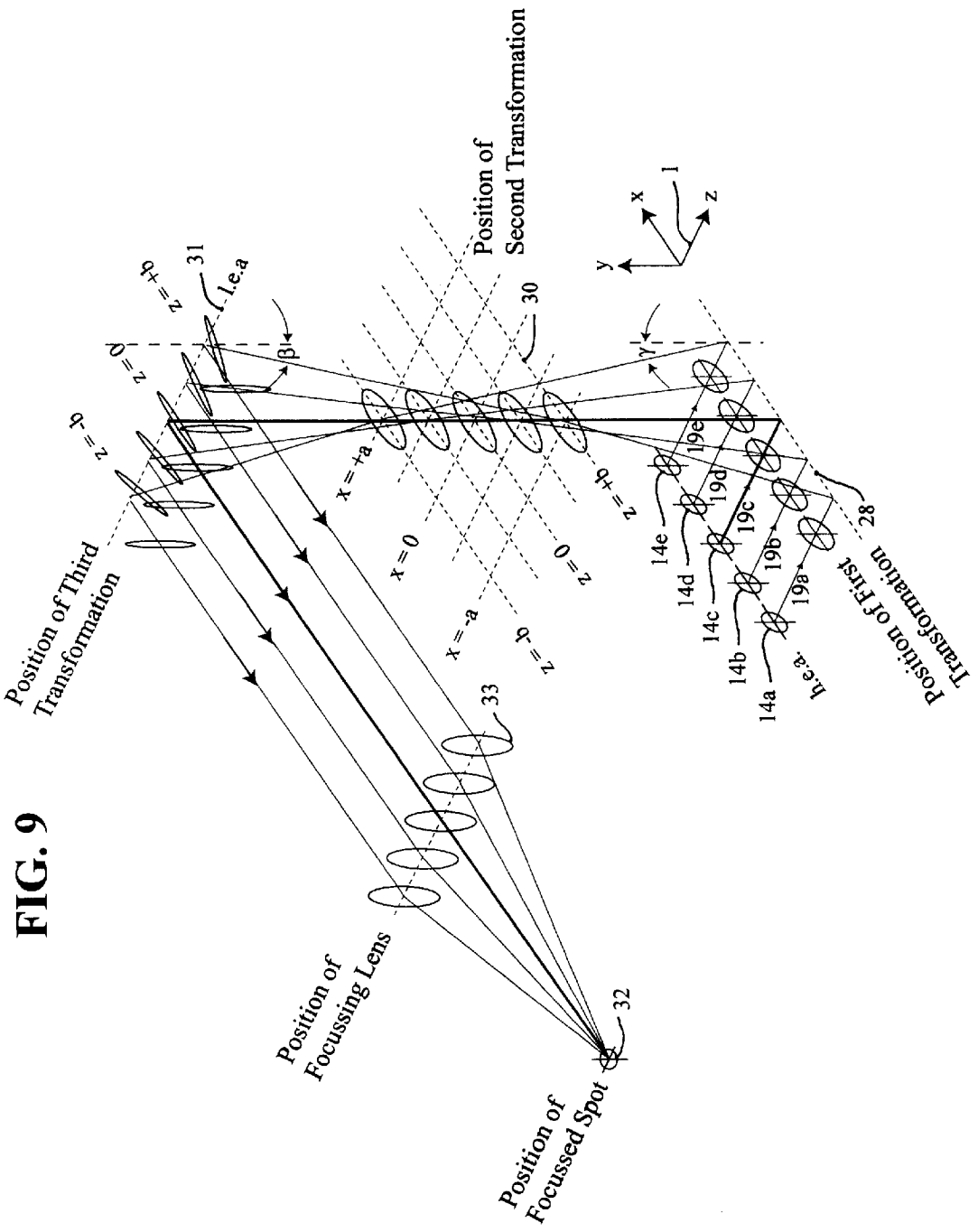
FIG. 9 describes the optical transformations of the subject invention in schematic form.

Referring now to the schematic description of the optical transformations of the subject invention in FIG. 9, a set of orthogonal coordinate axes 1 are defined and are labeled x, y and z so as to be usable as a reference coordinate system for describing the propagation direction and orientation of various elements of the subject invention. It will be apparent to those skilled in the art that the orientation of the entire optical system taken as a whole is unimportant, either with respect to the chosen coordinate axes or with respect to the directions ?horizontal@ and ?vertical@, and that the device will function as described without regard to orientation and that the use of predefined coordinate axes x, y and z are to enable efficient teaching of the subject art.

The subject invention is used in conjunction with an optical source 14, consisting of a plurality of identical, uniformly-spaced sources 14a–e, the illumination from which initially propagates in a direction along the z axis, with low etendu measured in a y-z or vertical plane and high etendu measured in an x-z or horizontal plane, and with a transverse extent much smaller in a vertical direction as compared to a horizontal direction, is first directed toward an optical device which performs a First Transformation along axis 28.

Figure 1:
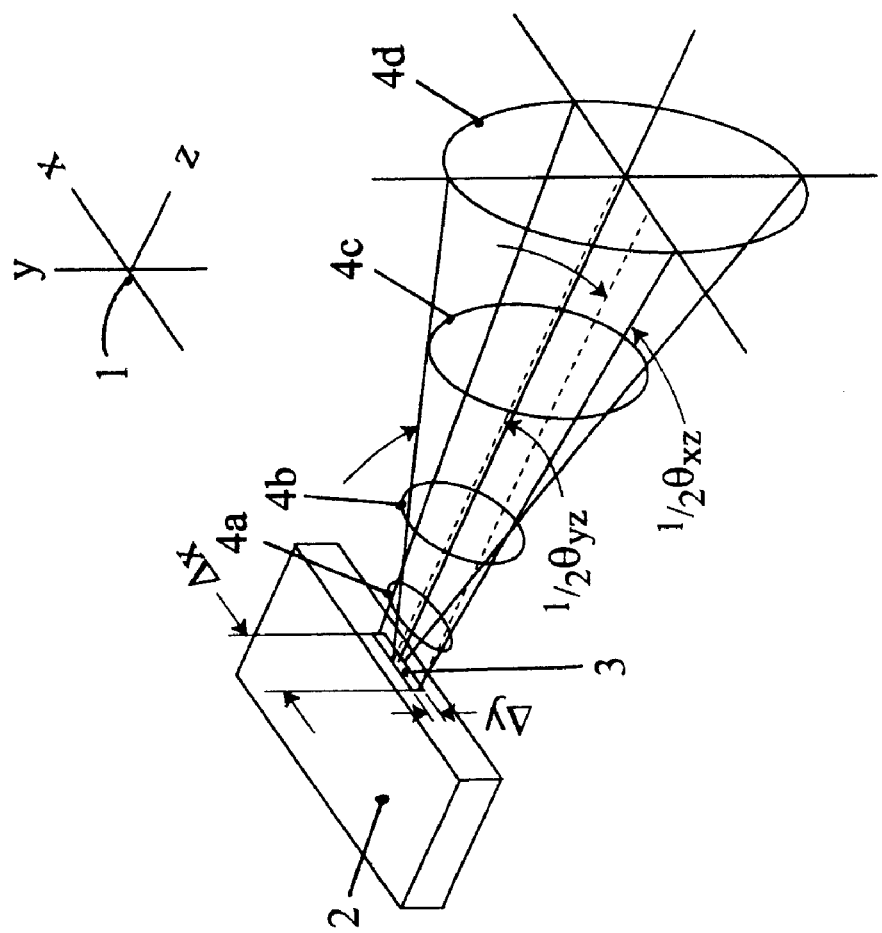
FIG. 1 describes the emission profile of a single diode laser.
Figure 2:
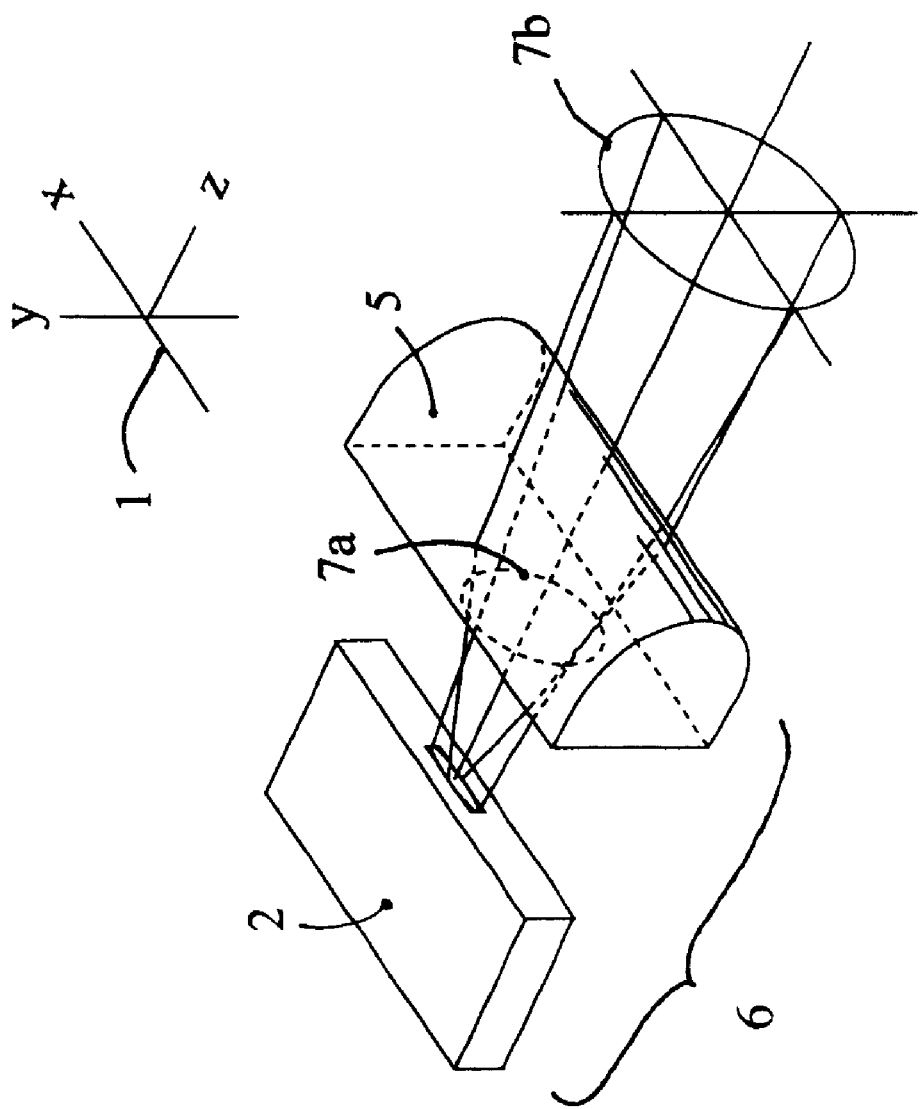
FIG. 2 describes the emission profile for a single laser diode followed by a cylindrical collimating lens.
Figure 3:
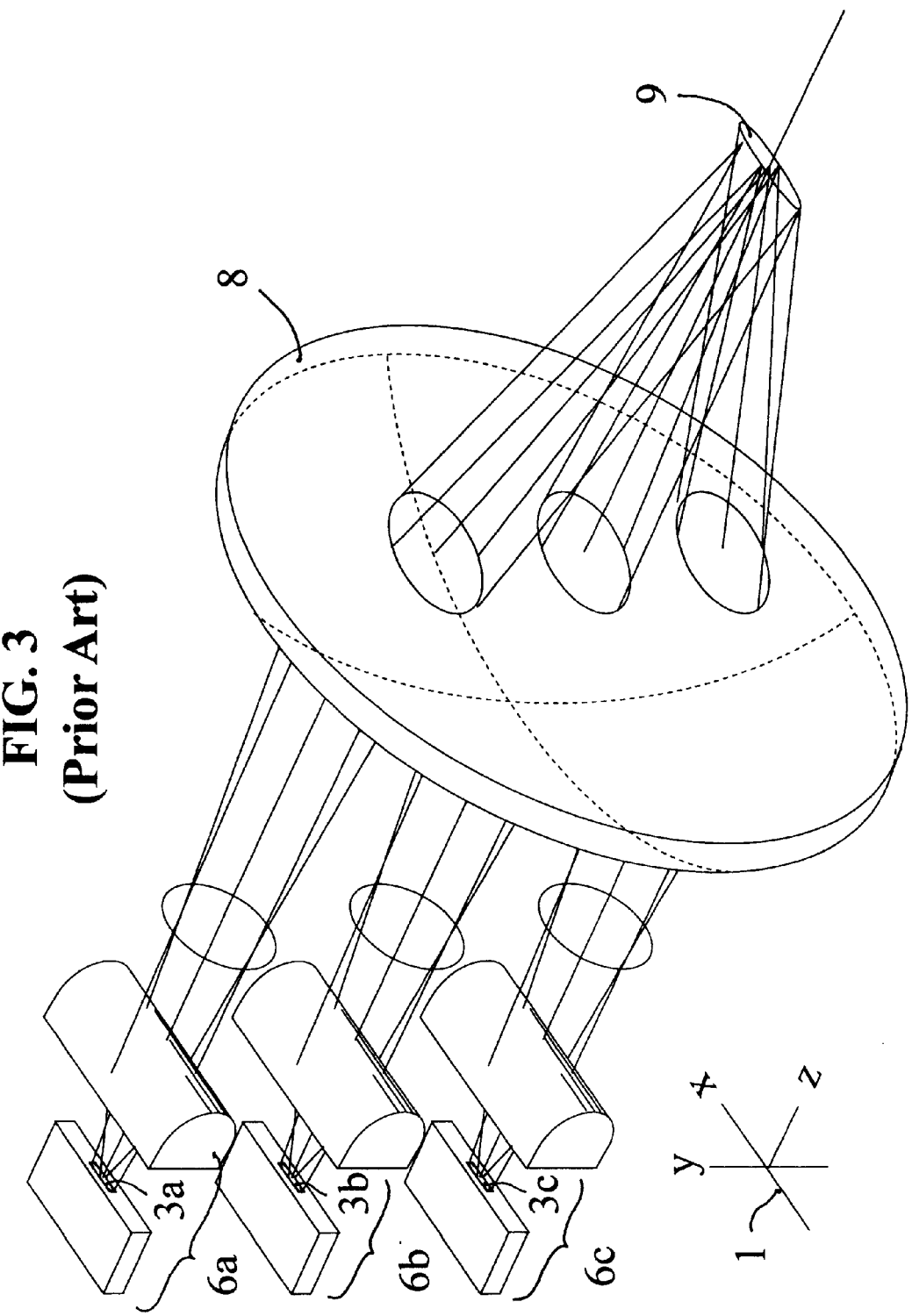
FIG. 3 describes the principles of the prior art of Fan (U.S. Pat. No. 5,081,637) for conserving optical brightness when combining the light from multiple diode laser sources.
Figure 4:
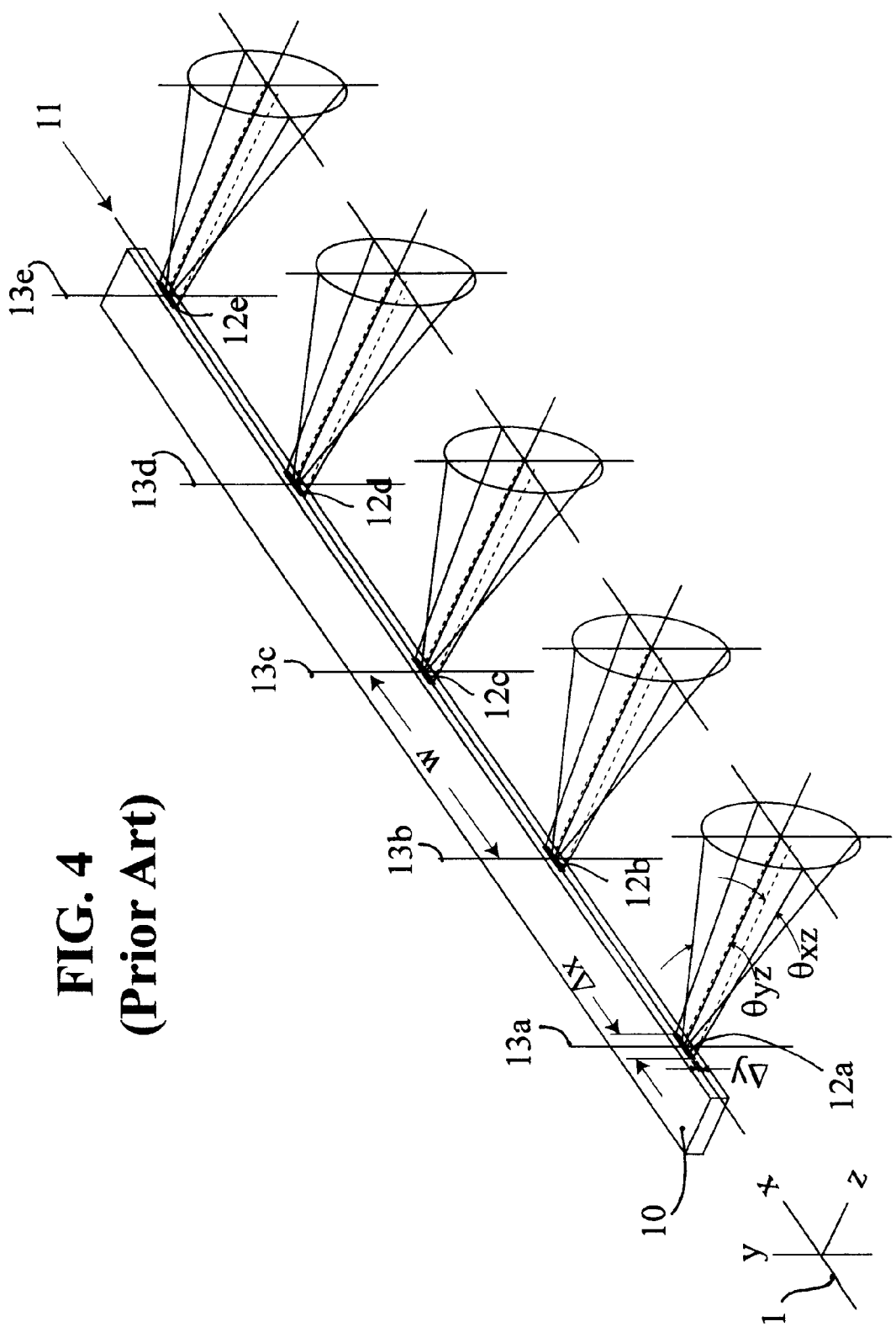
FIG. 4 describes the emission profile of a laser diode array.
Figure 5:
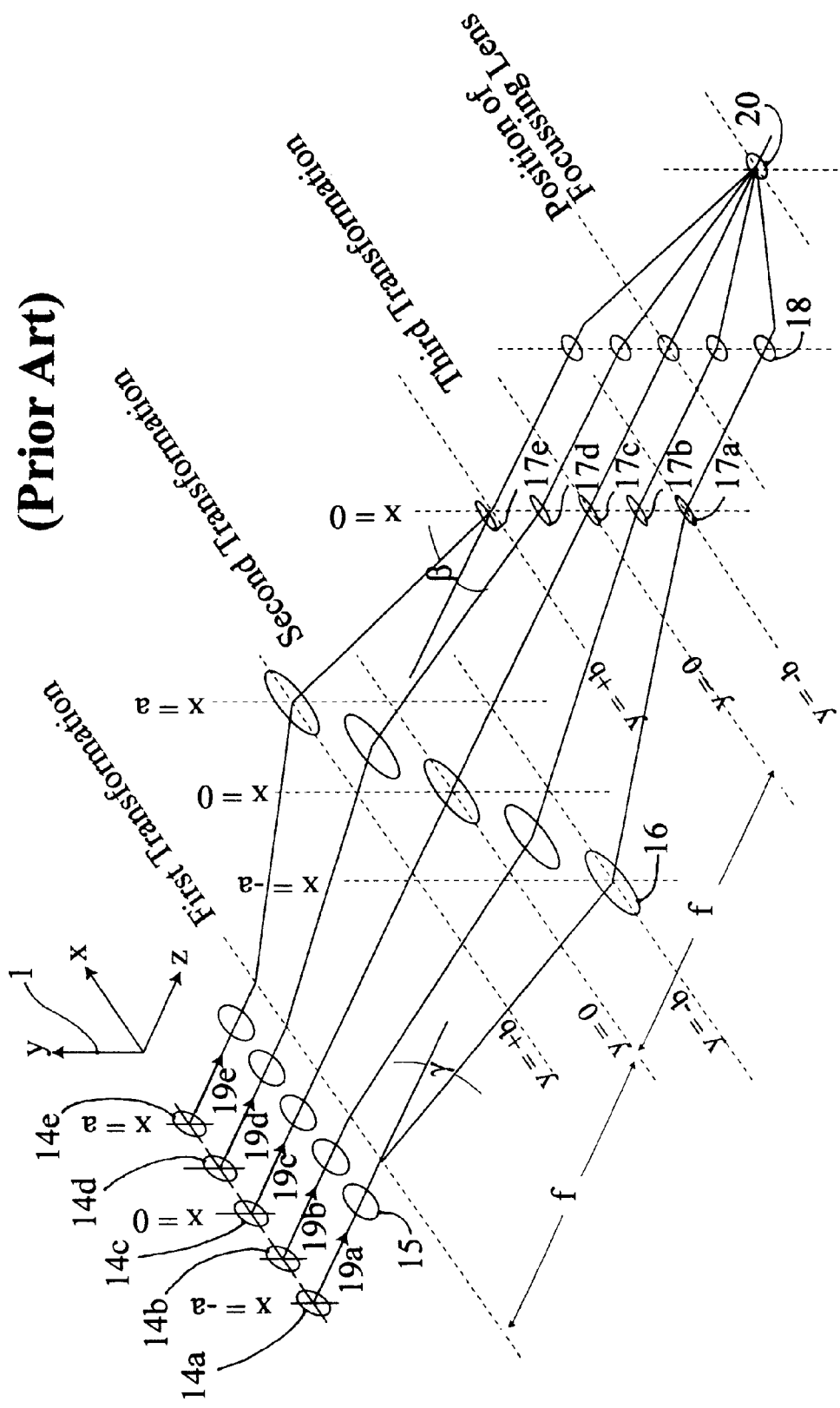
FIG. 5 describes, in schematic form, the optical beam transforming prior art of Lissotschenko (WO 99/46627).
Figure 6:
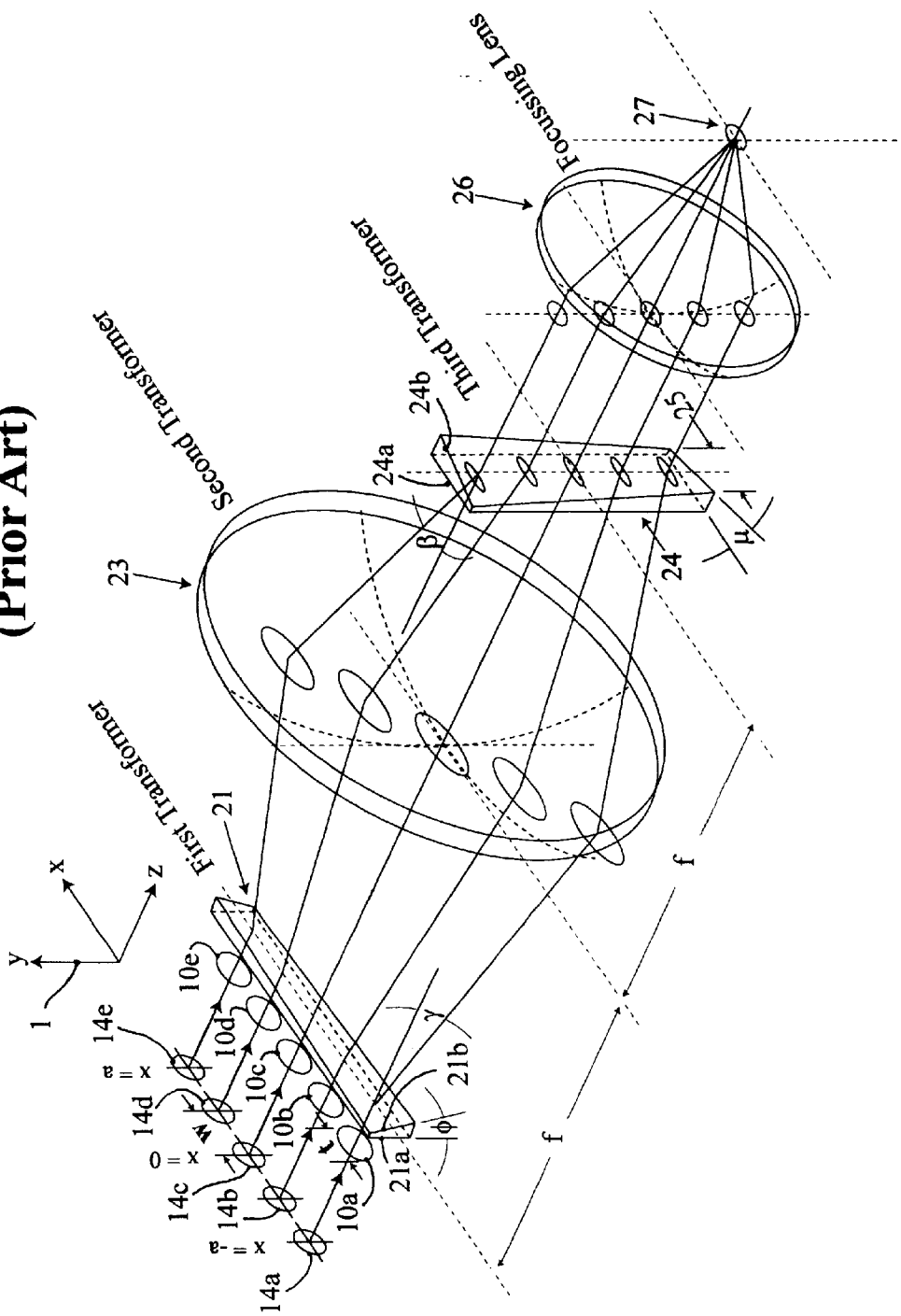
FIG. 6 describes the optical beam transforming prior art of Lissotschenko (WO 99/46627)), including three optical transformers.
Figure 7:
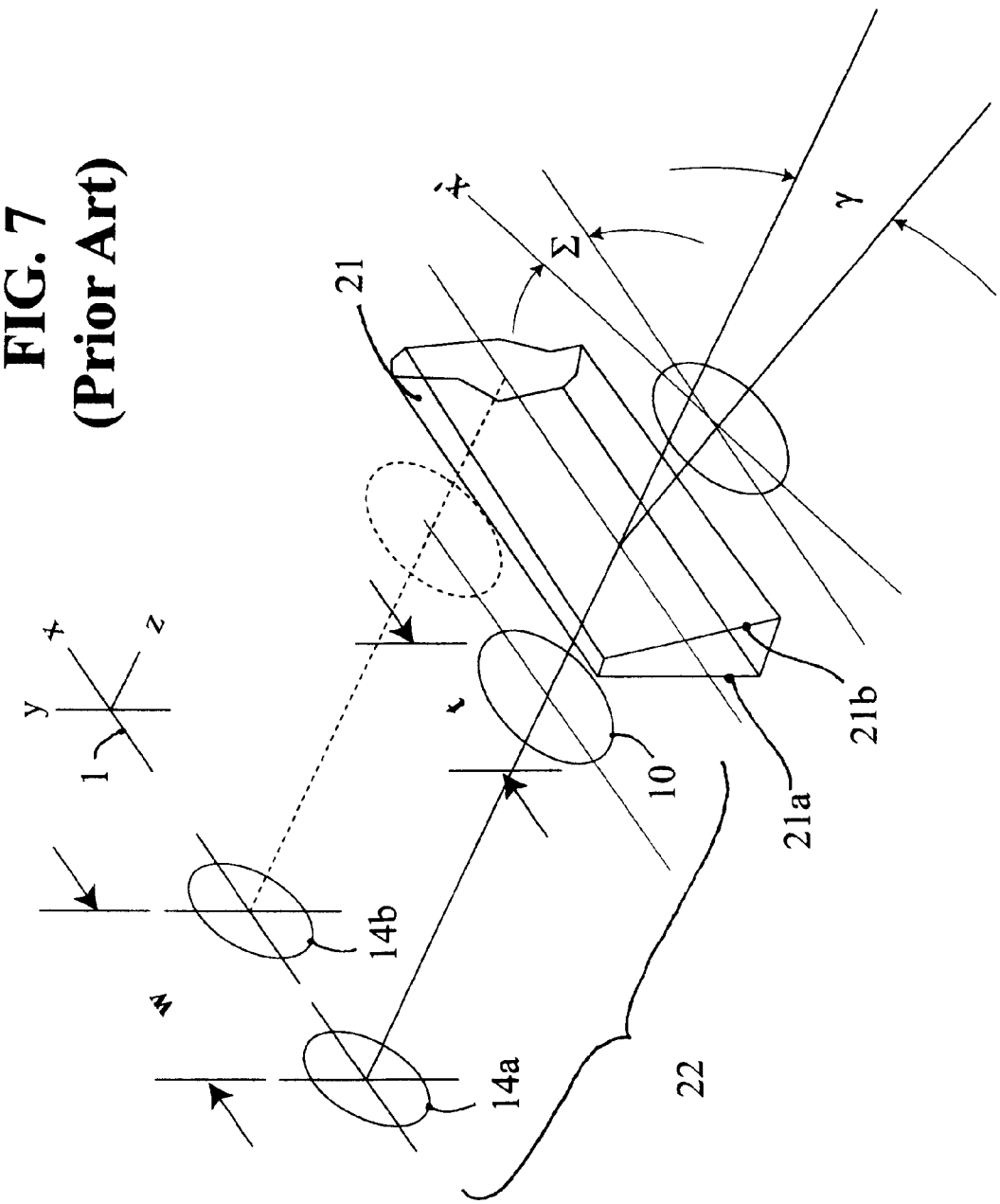
FIG. 7 describes the rotation induced in the elliptical intensity profile of the prior art of Lissotschenko (WO 99/46627).
Figure 8:
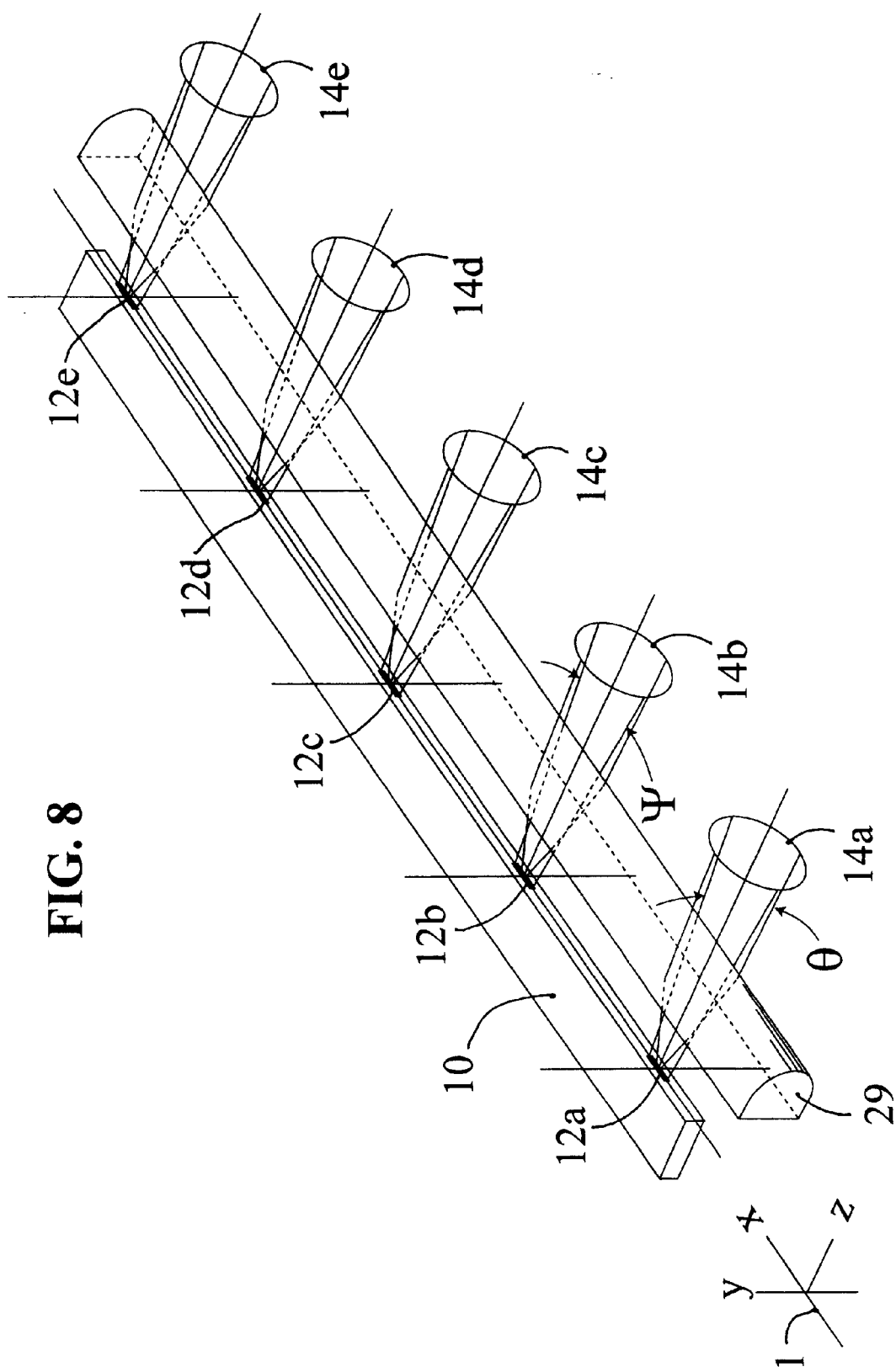
FIG. 8 describes the emission profile for a laser diode array followed by a cylindrical collimating lens and formed into a linearly disposed series of effective sources.

In the preferred embodiment described in FIG. 8, said optical source 14, consists of a plurality of individual sources 14a–e. Each of said individual sources is comprised of a single diode laser source 12a–e within a linear diode array of sources 10, with the high-etendu axes of each individual source aligned coaxially and horizontally, dispersed along the x-axis, in front of which is disposed a cylindrical lens 29 common to all diode laser sources 12a–e with optical power acting only in the low-etendu direction. Said cylindrical lens 29 transforms an optical source 12a–e into an effective optical source 14a–e with low angular divergence and larger transverse extent when measured along the low-etendu axis. Within limits imposed by the finite optical quality of said cylindrical lens, the etendu in the vertical direction remains unchanged, while the angular divergence of the source is simultaneously decreased to facilitate subsequent manipulation by mirrors and lenses. The subject invention may be used with any light source consisting of a series of linearly disposed individual sources or a single extended source, preferentially one with a transverse extent in one plane many times higher than a transverse extent in a perpendicular plane.

Referring again to FIG. 9, the function of the first transformer is to redirect the propagation direction 19a–e of the light from each source 14a–e to an angle γ, measured from the y-x plane, whose tangent is directly proportional to the position of each source measured from the center of the array. Sources to the right of center at x>0 are angularly deviated increasingly toward the −z axis direction, while sources to the left of center at x>0 are angularly deviated increasingly toward the +z axis direction. Thus, a mapping is achieved that relates the initial position x of a source to a subsequent direction of propagation γ.

The second Transformation is equivalent to the well-known Fourier transform, and maps a distribution of angular deviations, measured along an axis 28 at a position coincident with the first transformer into a distribution of spatial positions measured along an axis 31 coincident with the third transformer. Similarly, the Fourier transform maps the spatial distribution of light rays measured along an axis 28 at a position coincident with the first transformer to an output angular distribution measured along an axis 31 coincident with the third transformer. Therefore, the light from a source 14a at the extreme left side of the array at x=−a is repositioned to a location (x,z)=0,b along the line 31, while the light from the source 14d at the extreme right side of the array is repositioned to a location (x,z)=0,−b. Similarly, the light from the source 14a now redirected to (x,z)=0,b propagates at an angle +β with respect to the y-z plane, while the light from the source 14e redirected to (x,y)=0,−b propagates at an equal and opposite angle −β with respect to the same y-z plane. It can be appreciated that the sources 14a–e distributed uniformly along the x-axis with a coaxial alignment of the high-etendu axes h.e.a. at the first Transformation have been transformed to a set of virtual sources at the third Transformation distributed along axis 31, while simultaneously achieving a collinear alignment of the low-etendu axes l.e.a.

At the location of the third Transformation, the light beams have undesirable angular displacements β about the y-z plane. A third Transformation removes the undesirable angular deviation from each source, resulting in the illumination from all sources directed along the x axis within the x-z plane. At this point, the illumination from the multiple sources may be focused to a point 32 by using a single spherical lens, or some combination of spherical and cylindrical lenses, placed at axis 33.

Figure 10:
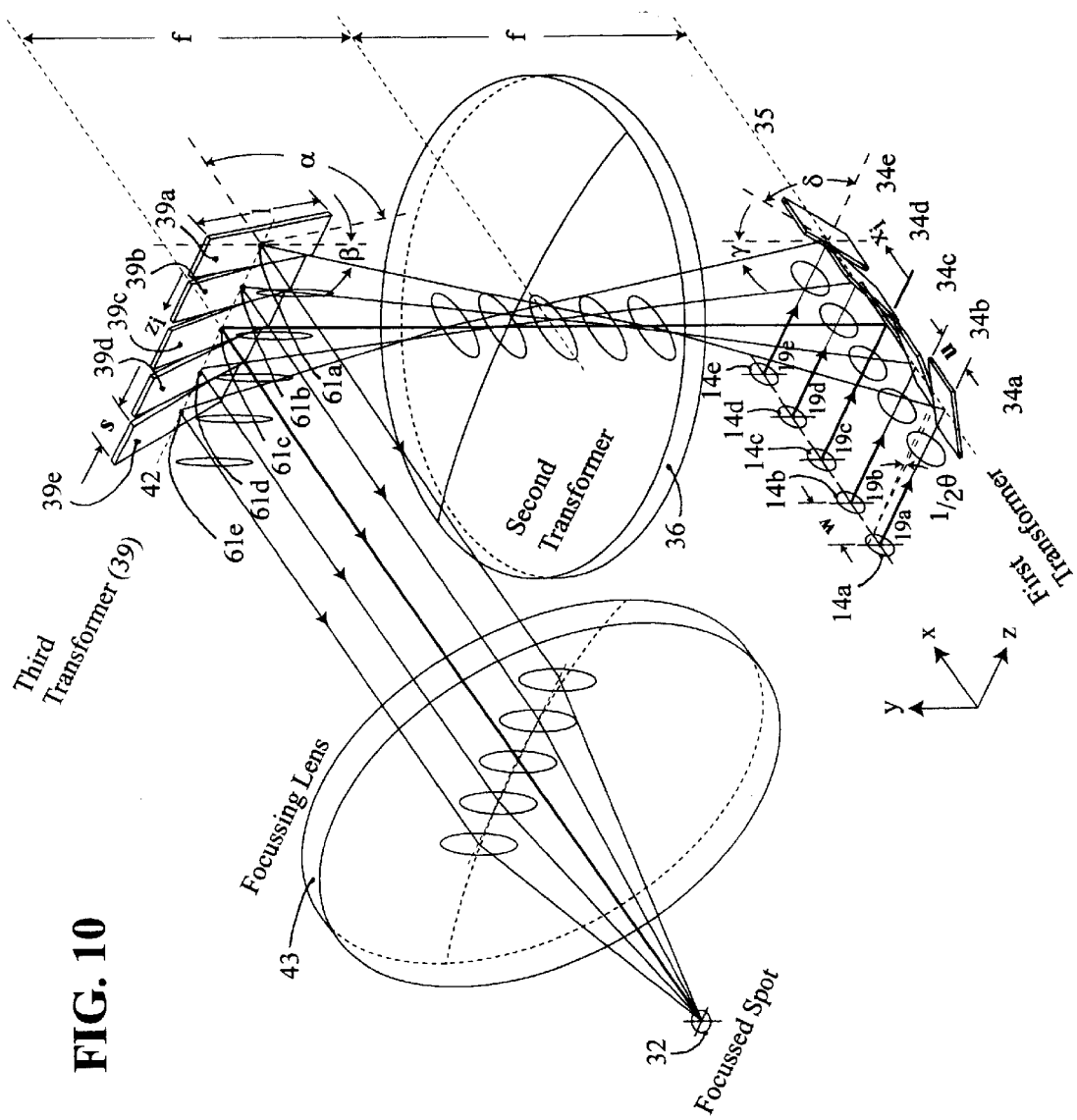
FIG. 10 describes the preferred embodiment of the subject invention including an extended optical source, three optical transformers and final focusing lens.

Referring now to the preferred embodiment, described in FIG. 10, which enables the transformations described in FIG. 9, it is seen that the first transformer consists of a series of flat mirrors 34a–e, oriented at angles δ with respect to the x-z plane, each of a width u equal to the separation between the individual diode sources w, and each placed in front of, and centered about the individual sources of the laser diode array.

Further, the angle δ of each mirror, measured from a horizontal or x-z plane, is adjusted to be incrementally greater than an angle Ω in progressing from the mirror at the center of the diode array out to the right edge of the diode array. Similarly, the angle of each mirror is adjusted to be incrementally smaller than an angle Ω when progressing from the center mirror 34c outward toward the left edge of the diode array. In the preferred embodiment, the angle Ω is selected to be 45 degrees. The individual light beams 31a–e from said optical source are reflected off of mirrors 34a–e and are directed in such a way as to appear to have originated from points, hereinafter referred to as virtual sources, lying on a common axis 35; this axis lies parallel to the x-z plane and parallel to a line connecting the original set of light sources. In the preferred embodiment of the subject invention, the axis 35 is the intersection of the individual infinite planes coplanar with the i-th mirror reflecting surfaces, and the relationship between the reflected angle γi and the mirror angle δi is given by $$\delta i = 2\delta i - \pi/2$$

Since the angular orientations δi of the individual mirrors 34a–e that make up the first transformer is constant across the illumination provided by each source 14a–e, no undesirable rotation is induced in the elliptical intensity profile as is present in the prior art of Lissotschenko (WO 99/46627).

Figure 11A:
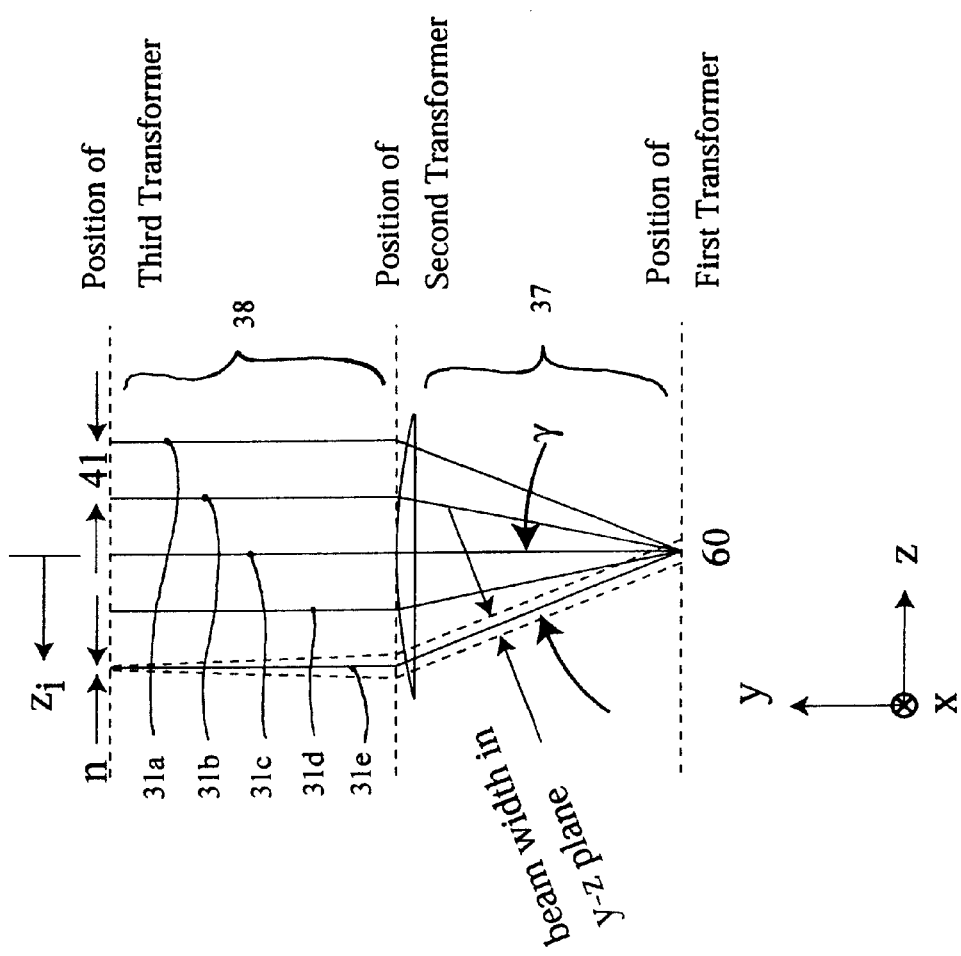
FIG. 11 describes the action of the third transformer when viewed from two orthogonal directions.
Figure 11B:
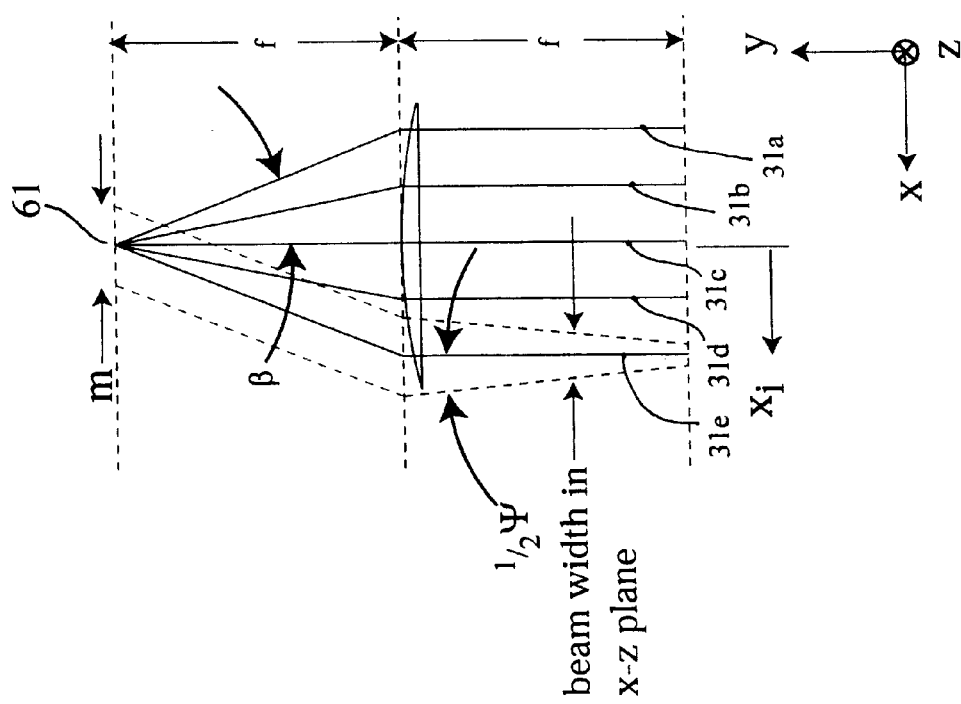

Referring once again to FIG. 10, the second transformer 36, the aforementioned Fourier Transform Lens, is centered along the y-axis, and lying in the x-y plane, at a position spaced one focal length f from the axis 35. The function of the lens and its transforming action on the light ray paths passing between the first and third transformer may be understood by referring to FIG. 11. Said figure displays the propagation of the light rays traversing the region between the first and third transformers when viewed from two orthogonal directions as indicated by the coordinate axes associated with each half of FIG. 11. Referring first to FIG. 11b, the rays 31a–e traversing the region 37 between the first and second transformers appear to emanate from a single point 60 at the location of the first transformer, as per the previously-described function of said first transformer. Since the second transformer, the Fourier transform lens, is specified to be placed one focal length f from the first transformer, then the rays traversing the region 38 between the second and third transformers must take the form of a set of parallel rays, as is the well-known function of a lens with positive focal length. Conversely, as shown in FIG. 11a, when viewed from a direction coincident with the z-axis, the rays traversing the region 37 between the first and second transformers take the form of a set of parallel rays as per the previously-described function of said first transformer. As per the well-known function of a lens with positive focal length, the rays traversing the region 38 between the second and third transformers will appear to converge to the focal point 61 of the lens, coincident with the location of the third transformer 39. However, since said rays are viewed in projection, said rays focus not to a point, but to a series of points 61a–e uniformly dispersed along the z-axis at the third transformer as shown in FIG. 10.

In the subject invention, the third transformer 39 consists of a device substantially identical, but rotated by 90 degrees about the z axis, to the first transformer 34 of the subject invention. The orientations of the individual mirrors are chosen to remove the angular distribution, in the x-y plane, of the rays 31a–e incident on the third transformer, said angular distribution being induced earlier by the second transformer 36 or Fourier Transform Lens. Subsequently the beams reflected from the third transformer may be focused to a point 32 by using a single spherical lens 43 or some combination of spherical and cylindrical lenses.

For the third transformer to function properly, the individual beams must be redirected and reshaped so as to illuminate one and only one of the mirrored surfaces of the third transformer. For the preferred embodiment in which the angles δi of the i-th mirror of the first transformer increase uniformly from one mirror to a subsequent mirror, the angle δi+1−δi between successive mirrors of the first transformer must be sufficient to produce a separation 41 between the centers of the beams larger than the spatial extent n of the individual beams when measured at the third transformer. Therefore, referring to FIG. 10, it can be seen that the difference between subsequent mirror angles of the first transformer must be given by $$\delta i+1-\delta i > \frac{1}{2}\theta$$

where θ is the angular divergence of the light sources measured in the low-etendu or y-z plane.

Further, the individual mirror elements of the third transformer must be of adequate length 1 so as to capture the entirety of light reflected from each corresponding mirrored element of the first transformer. Referring now to FIG. 11a, it is seen that the spatial extent m of an individual beam measured at the third transformer is controlled by the divergence of the laser diode source in the x-y or high-etendu plane. For the preferred embodiment in which the first transformer is positioned in close proximity to the laser diode source, the spatial extent μ is approximately given by f Ψ, where f is the focal length of the second transformer and Ψ is the angular divergence of the laser diode source in the high-etendu plane. In the preferred embodiment, the orientation angles α of the mirrored elements of the third transformer are all nominally near 45 degrees, thereby requiring the length of an individual mirror element to be approximately m/sin (45 deg.).

Referring to FIGS. 10 and 11b, it can be seen that the positions zi of the i-th beam at the third transformer are determined by the angles δi of the individual mirrors at the first transformer; the positions zi measured along an axis 42 aligned with the z axis and passing through the third transformer are given by $$zi = f \tan(2\delta i - \pi/2)$$

where zi is the position of the i-th beam measured from the center of the third transformer, δi is the angle of the mirror of the first transformer associated with said beam and f is the focal length of the Fourier transform lens. The spatial extent of an individual beam n at the third transformer in the z direction is given by $$n = f \tan \theta$$

The individual mirrors 39a–e of the third transformer must be sufficiently wide so that the spatial extent n of the beam in the z direction at said third transformer is smaller than the width s of said individual mirror. Therefore the width s of an individual mirror of the third transformer must be greater than or equal to f tan θ.

Finally, the relationship between the angles $\alpha i$ of the i-th mirror in the third transformer and the positions of the individual diode sources is given by $$f \tan(2\delta i - \pi/2) = xi$$

where xi is the position of a given light source measured from the center of the extended linear array of sources.

In the preferred embodiment, it is desired to make the mirror width u and angular orientations δ of the components of the first transformer identical to the mirror width s and angular orientations α those of the third transformer. This is easily achieved by making the width of all mirror elements equal to the diode source separation w and by setting the angle $\delta i$ and $\alpha i$ of the mirrors of first and second transformers respectively to be $$f \tan(2\delta i - \pi/2) = f \tan(2\alpha i - \pi/2) = xi = zi$$

Additionally, it is necessary to start with a source of sufficiently low angular divergence θ such that the difference in successive deflection angles $\gamma i+1 - \gamma i$ is greater than the angular divergence θ of the source illumination in the y-direction.

Figure 12:
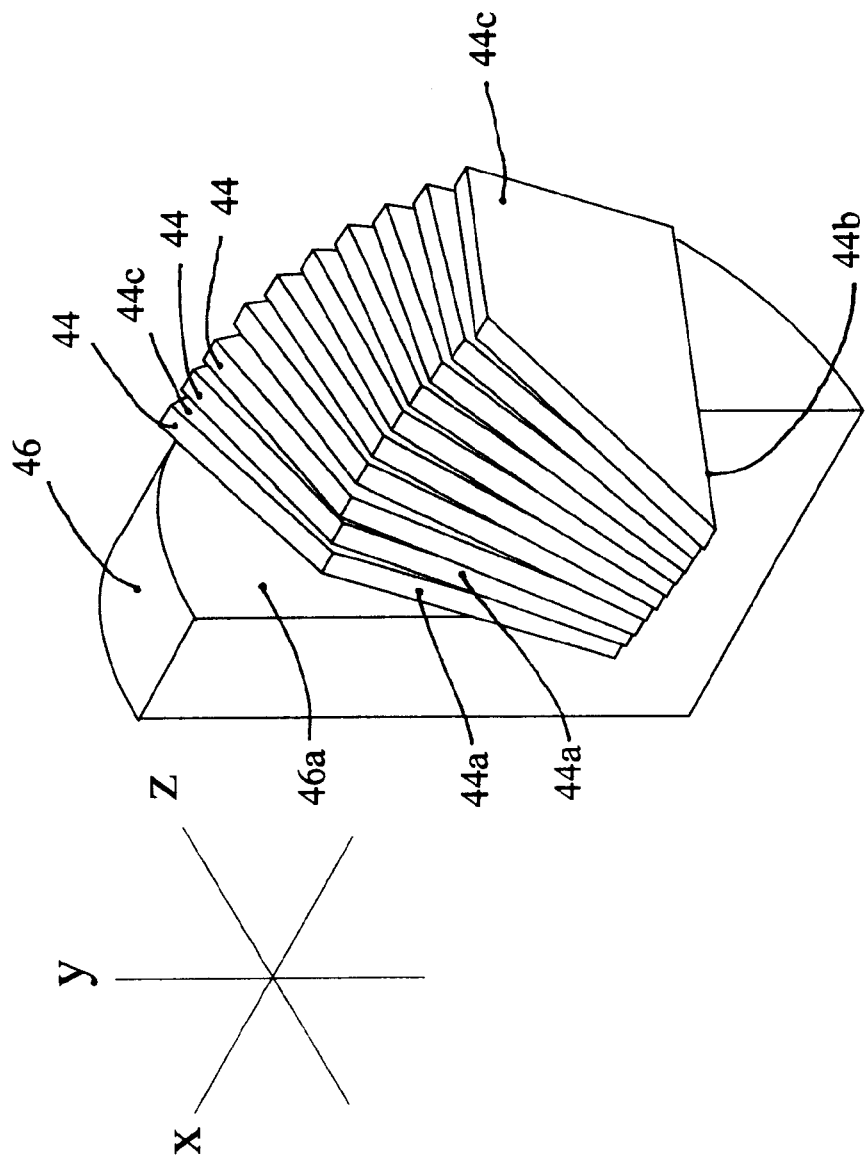
FIG. 12 describes the detail of the first and third transformers of the subject invention, showing an assembly of 10 mirror elements and a support.
Figure 13:
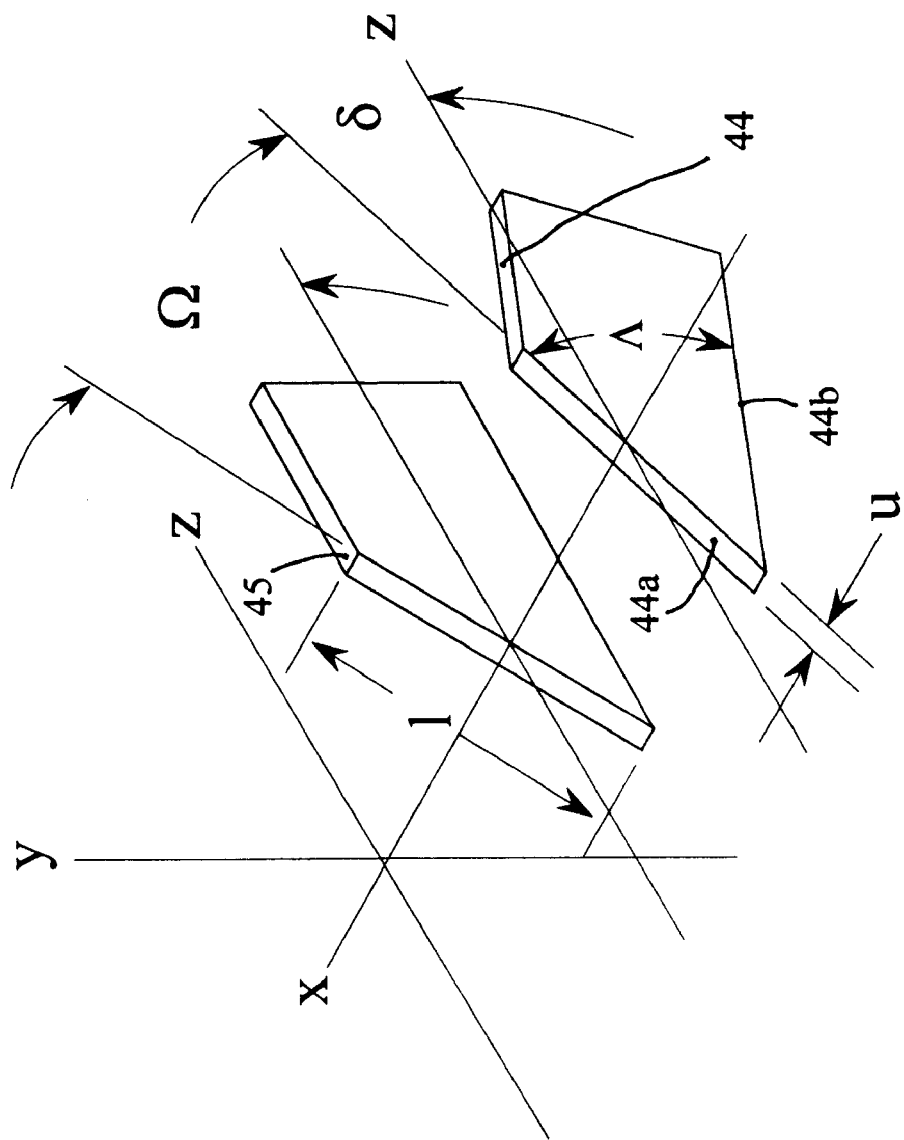
FIG. 13 describes a pair of mirror element of the first and third transformer, displaying a central mirror element and a subsequent mirror element.
Figure 14:
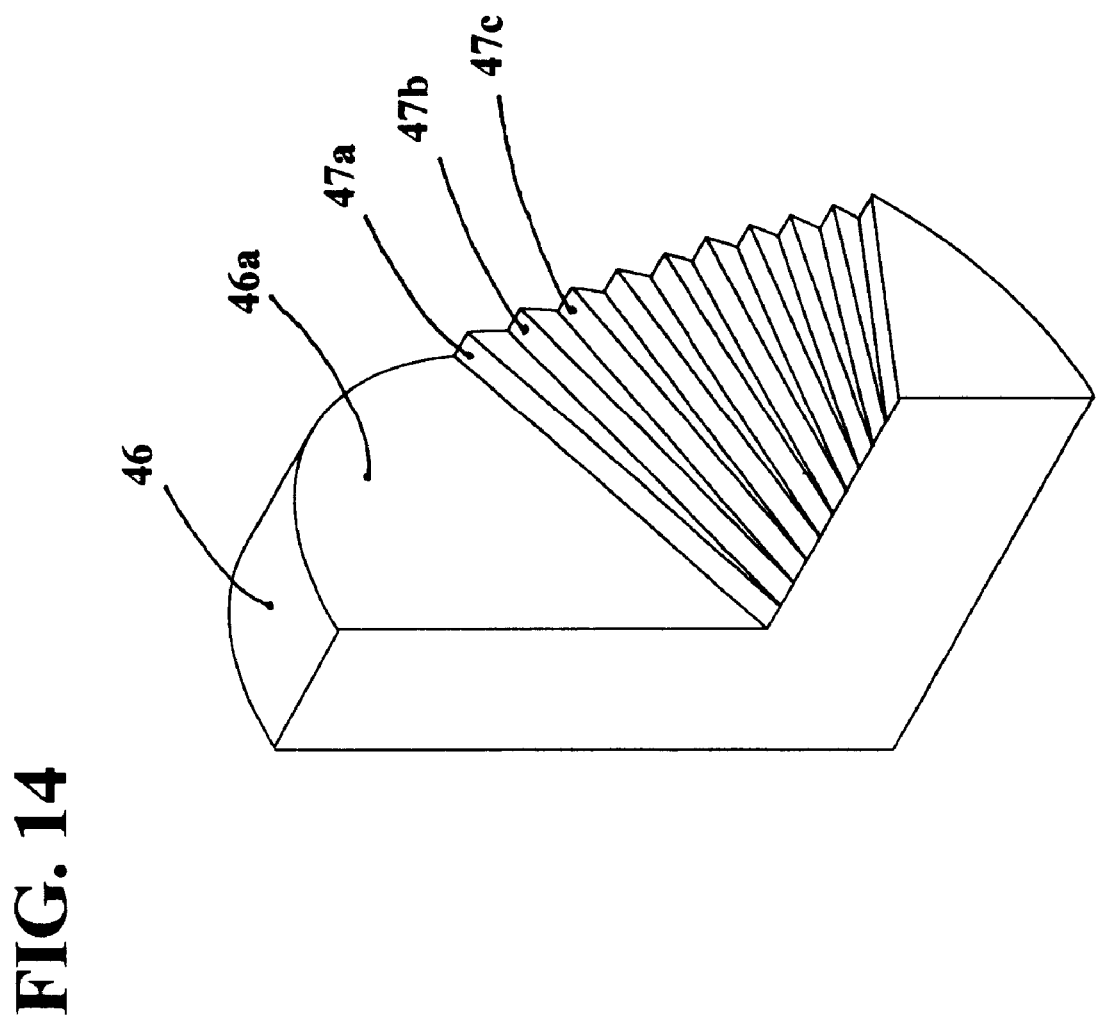
FIG. 14 describes an orienting fixture of the first and third transformer.

Referring now to FIGS. 12, 13 and 14, the preferred embodiment of the first and second transformers consists of a series of essentially identical mirror elements 44 fabricated with flat and parallel major sides 44c, and having a flat reflecting surface on a first edge 44a and having a second edge 44b arranged at a particular angle A with respect to the first edge 44a. Said mirror elements are mounted on a fixture 46 consisting of a major surface 46a and a plurality of ledges 47a, b, c . . . , defining planes which intersect at a line. The second edge 44b of each mirror element is affixed against one of said ledges 47a, b, c . . . of the support 46, and the angular orientations of the ledges thereby define the angle δ between the first edge 44a and the x-z plane. The major side 44c of one mirror element is affixed to the major surface 46a of the support 46. The major side of each subsequent mirror element is affixed to a major side of the previous mirror element and is thereby held parallel to the major surface 46a of the support 46.

The mirror elements may be fabricated from materials including, but not limited to, glass, fused or crystalline quartz, metals or other materials capable of being polished or capable of accepting an added optically-smooth and reflective coating along the first edge 44a.

Referring specifically to FIG. 13, it can be seen that the central flat mirror element 45 within a plurality of mirror elements of the first transformer is oriented so that the first edge 45a of the central flat mirror element is aligned at the previously-described angle Ω with respect to the x-z plane, while the first edge 44a of a subsequent flat mirror element located toward the end of the diode array source has been set at a respective angle δ less than the angle Ω. For the purpose of simplifying the drawings, the angle Ω shown in FIG. 13 is selected, but not limited, to be approximately 45 degrees.

While the particular angle Λ as shown in FIG. 13 is approximately 45 degrees, it is chosen only for convenience and may be any angle which enables both inexpensive fabrication of the flat mirrors while simultaneously allowing placement of the first transformer in close proximity to the laser diode array. The thickness u of the flat mirror element is usually chosen to be equal to the separation w between the individual sources comprising a laser diode array but may also be chosen to be an integer multiple of the spacing between laser diode sources. For a laser diode array manufactured by Thomson Laser Diodes, Model # TH-C 1420-S, with 24 individual sources distributed over a total length of 1 cm, a thickness u of 416 microns is appropriate. However, for simplification of the drawings, an orienting fixture 46 supporting 10 flat mirror plates is displayed.

The alignment fixture described in FIG. 14 is best chosen to be fabricated from materials that will allow the formation of well-defined first and second edges and flat and parallel major sides. Such materials include, but are not limited to, hard plastics, metals or glass. In the fixture described in FIG. 14, the fixture itself may be incorporated into the mechanical assembly of the entire apparatus; the individual mirror elements being installed into the fixture one at a time, at which time each element is affixed with a suitable adhesive. Thin, low-viscosity adhesive that is curable with ultra-violet light is used in the present embodiment, enabling rapid alignment of each individual flat mirror plate, after which the plates are firmly affixed by applying ultra-violet light to the adhesive. Alternately, the fixture may be used as only an alignment tool to properly adjust the respective angles δ of each mirror element, while the mirror elements are bonded to each other.

As described earlier in FIG. 11, the length l of the individual mirror elements of the third transformer must be selected to be greater than or equal to the extent of the individual beam illumination in the x-y plane. Said extent is determined by the angular divergence of the laser diode emission in the high etendu axis and the focal length of the second transformer; for the Thomson diode array Model # TH-C1420-S with a FWHM angular divergence of 11 degrees and a second transformer of focal length 25 mm, a length l of at least 7 mm is required. There is no substantial disadvantage to making the mirror length l substantially greater than this value of 7 mm; the additional length further improves the alignment ease of the third transformer assembly.

Figure 15:
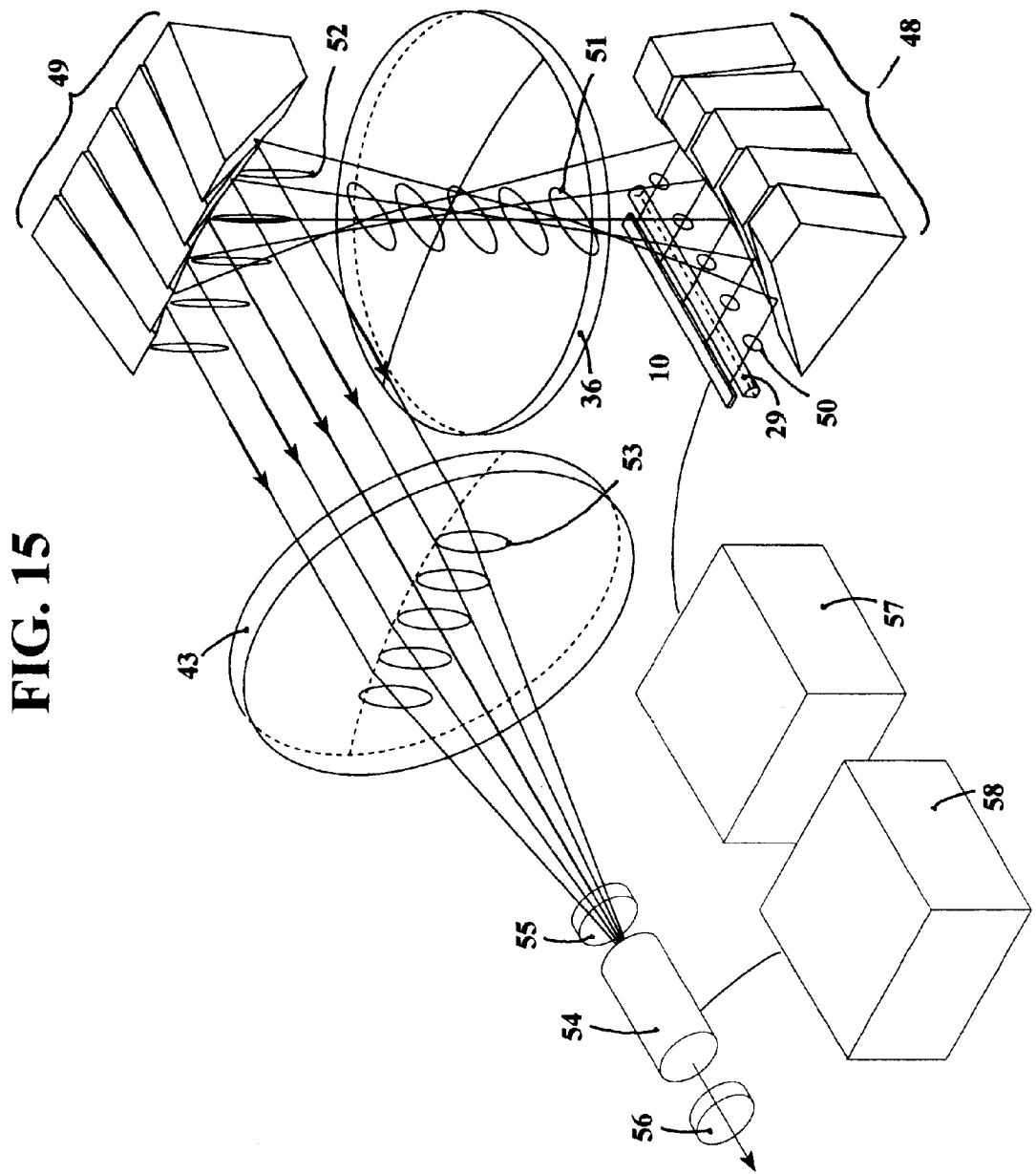
FIG. 15 describes the use of the subject invention in a system for the optical pumping of a laser gain medium.

FIG. 15 describes one possible system incorporating the subject invention, with a solid-state laser gain medium and resonator pumped by the illumination from the subject invention, consisting of a laser diode array 10 of 5 individual laser sources, a cylindrical lens 29 for collimation of the laser diode output illumination in the vertical or low-etendu direction, a first transformer 48, a second transformer 36, a third transformer 49, a focusing lens 43, elliptical intensity profiles 50, 51, 52 and 53 describing the evolution of the beam size during propagation through the optical system, a solid-state gain medium 54 interposed between laser cavity mirrors 55 and 56. A laser diode array of 5 individual sources is chosen for the purpose of enhancing the clarity of the figures; commonly available diode laser arrays are often provided with between 10 and 40 individual laser sources per each centimeter of array length. A laser diode power supply and temperature control system 57 is used for providing electrical power and a controlled temperature environment for the laser diode array, while a separate temperature-controlling mechanism 58 is incorporated for the cooling of the laser gain medium 54. Similarly, the laser gain medium 54 and resonator mirrors 55, 56 may be replaced with an optical fiber, wherein the objective is to efficiently couple the output of the subject invention to a remote location.

While the prior art of Spaeth (U.S. Pat. No. 5,808,323) describes the assembly of a series of flat, identically oriented and essentially parallel, mirrored thin elements, the subject invention requires that such elements be assembled at different angles, resulting in a transformer substantially different and unrelated to the function of the optical device described in the prior art of Spaeth (U.S. Pat. No. 5,808, 323).

Additionally, while the prior art of Lewis (U.S. Pat. No. 5,592,233) describes the fabrication of an optical device which may be assembled from a series of flat mirrored components, said prior art requires that two individual angled surfaces be fabricated onto the thin edge of said flat mirrored components, requiring the development of extensive tooling and fixturing to hold said flat components during grinding and polishing, the complexity of said tooling increasing if it is desired to fabricate multiples of said components simultaneously. Still further, if changes in the angles are desired, modifications to said tooling and fixturing must be made, further adding to the cost of fabrication, whereas in the subject invention, all flat mirrors may be fabricated in an identical manner for several embodiments of the subject invention, requiring only a modification in the aforementioned orienting fixture 46 of FIG. 14.

Several modifications to the preferred embodiment herein described may be made without changing the spirit and intent of the described invention. For example, as pertains to the design of the first transformer, the average difference in angular orientation between the incident and reflected beams is approximately 90 degrees and is chosen for the purpose of illustration, but may be chosen to be some other angle; shallow deviation angles requiring mirrors of larger spatial extent to capture the incident light and steep deviation angles nearer to 180 degrees requiring some technique to prevent the reflected beams from striking the aforementioned laser diode source, including but not limited to an additional plane mirror to redirect the reflected light beams as a group.

Still further, additional mirrors may be added in the optical beam path immediately preceding or following said first and third transformers, so as to redirect the incident or reflected beams by approximately 90 degrees and, in so doing, provide an optical component layout dispersed generally in a straight line, thereby allowing a more compact and simplified mechanical assembly.

Additionally, the number of mirrors of the first and third transformers need not necessarily be equal to the number of individual diode sources. For example, the number of mirrors may be reduced such that an integer number of individual diode sources may correspond to a given flat mirror plate within the first transformer. While said configuration is not the preferred embodiment, some improvement in maintaining the optical brightness of a source diode is obtained versus the use of the entire diode array source without the benefit of the subject invention.

Still further, although the reflective plates shown in FIG. 13 are of a trapezoidal shape, other shapes may be used, comprising at least one flat reflective edge, which allows a plurality of said plates to be assembled side to side and accurately positioned at the requisite angular orientation as described earlier in the above disclosure. In the preferred embodiment, each flat mirror plate consists of at least one flat reflective edge and another flat reference edge used for the purposes of mechanical orientation, in which the angular orientation of said reflective and reference edges are fabricated to high precision for a plurality of identical pieces. While it is possible to use a common edge for both functions of reflection and reference, it is advantageous to use separate edges for said functions so as to reduce the risk of damage to the reflective edge.

What is claimed is:

1. An optical device operable with an array of light sources arranged generally in a line, the array of light sources emitting beams having respective high etendu axes and low etendu axes, and arranged so that the high etendu axes are essentially collinear, comprising:

a first optical transformer redirecting emitted beams from respective light sources in the array at angles set in relation to a distance of the respective light sources from a point on the line, resulting in a set of angularly deviated beams;

a second optical transformer positioned to receive the set of angularly directed beams, and redirecting the set of angularly deviated beams to a set of spatially deviated beams at a plane;

a third optical transformer positioned in the plane, to redirect the set of spatially deviated beams to a set of parallel beams having essentially collinear low etendu axes;

wherein at least one of the first and second optical transformers comprises a series of flat mirrors positioned in front of light sources in the array of light sources, and oriented at respective angles.

2. The optical device of claim 1, wherein the second optical transformer comprises a Fourier transform lens.

3. The optical device of claim 1, wherein the first and third optical transformers comprise essentially identical components.

4. The optical device of claim 1, including an optical element positioned to receive the set of parallel beams and to focus the set of parallel beams at a focal point.

5. The optical device of claim 1, wherein in an x, y, z coordinate space, the line and the plurality of beams emitted by the array of light sources lie generally in the x-z plane, said line is parallel with the x-axis, said array of light sources has a center, and the first optical transformer comprises a plurality of flat reflecting surfaces arranged respectively to reflect corresponding beams emitted by the plurality of light sources to an angle $\gamma$, measured from the y-x plane, whose tangent is proportional to the position from the center of the array, of the light source or sources in the array emitting the corresponding beams.

6. The optical device of claim 5, wherein the first transformer comprises a plurality of flat reflecting surfaces oriented at respective angles $\delta$ with respect to the x-z plane, each with a width u equal to a separation distance between the corresponding beams.

7. The optical device of claim 5, wherein the array includes a last light source at a first end and a last light source at a second end of the line, and the respective angles $\delta$ for reflecting surfaces to a first side of the center are set incrementally greater than an angle $\Omega$ in progressing from the reflecting surface at the center of the array out to the last light source at the first end, and for reflecting surfaces to a second side of the center are set incrementally less than $\Omega$ in progressing from the reflecting surface at the center of the array out to the last light source at the second end.

8. The optical device of claim 7, wherein $\Omega$ is approximately 45°.

9. The optical device of claim 5, wherein the first optical transformer comprises a plurality of flat reflecting surfaces oriented at respective angles $\delta$ with respect to the x-z plane, each with a width u equal to a separation distance between the corresponding beams, and an alignment fixture supporting said plurality of flat reflecting surfaces.

10. The optical device of claim 5, wherein the first optical transformer comprises:
   a fixture having a major surface, and a plurality of ledges extending progressively outwardly from the major surface and having respective widths, and oriented at respective angles such that the plurality of ledges define planes that intersect at a line; and
   a plurality of mirror elements comprising respective pieces flat on one major side, having a flat reflecting surface on a first edge, the flat reflecting surfaces being respective ones of the plurality of flat reflecting surfaces, and having a second edge arranged at a particular angle with respect to the first edge, the plurality of mirror elements mounted on the fixture so that each has its respective second edge on one of the plurality of ledges, a first mirror element has its major side against the major surface of the fixture, and successive mirror elements in the plurality of mirror elements has its respective major side parallel with the major side of the first mirror element, the respective angles of the plurality of ledges arranged so that the flat reflecting surfaces on the first edges are oriented at said respective angles δ with respect to the x-z plane.

11. The optical device of claim 10, wherein the particular angle is 45°.

12. The optical device of claim 10, wherein the plurality of mirror elements comprise essentially identical pieces.

13. The optical device of claim 1, wherein in an x, y, z coordinate space, the line and the plurality of beams emitted by the array of light sources lie generally in the x-z plane, said line is parallel with the x-axis, said array of light sources has a center, and the third optical transformer comprises a plurality of flat reflecting surfaces arranged respectively to reflect corresponding beams emitted by the plurality of light sources to an angle γ, measured from the y-x plane, whose tangent is proportional to the position from the center of the array, of the light source or sources in the array emitting the corresponding beams.

14. The optical device of claim 13, wherein the third optical transformer comprises a plurality of flat reflecting surfaces oriented at respective angles δ with respect to the x-z plane, each with a width s equal to a separation distance between the corresponding beams.

15. The optical device of claim 13, wherein the array includes a last light source at a first end and a last light source at a second end of the line, and the respective angles α for reflecting surfaces to a first side of the center are set incrementally greater than an angle Ω in progressing from the reflecting surface at the center of the array out to the last light source at the first end, and for reflecting surfaces to a second side of the center are set incrementally less than Ω in progressing from the reflecting surface at the center of the array out to the last light source at the second end.

16. The optical device of claim 15, wherein the angle Ω is approximately 45°.

17. The optical device of claim 6, wherein the third optical transformer comprises a plurality of flat reflecting surfaces oriented at respective angles δ with respect to the x-z plane, each with a width u equal to a separation distance between the corresponding beams, and an alignment fixture supporting said plurality of flat reflecting surfaces.

18. An optical transformer, adapted to receive a plurality of beams in an x, y, z coordinate space in the x-z plane on a line parallel with the x-axis, said plurality of beams has a center on the line, comprising a plurality of flat reflecting surfaces arranged respectively to reflect corresponding beams in the plurality of beams to an angle γ, measured from the y-x plane, whose tangent is proportional to the position from the center.

19. The optical transformer of claim 18, wherein the flat reflecting surfaces are oriented at respective angles δ with respect to the x-z plane, each with a width u equal to a separation distance between the corresponding beams.

20. The optical transformer of claim 18, wherein the plurality of beams includes a first beam at a first end and a last beam at a second end of the line, and the respective angles δ for reflecting surfaces to a first side of the center are set incrementally greater than an angle Ω in progressing from the reflecting surface at the center of the array out to the last light source at the first end, and for reflecting surfaces to a second side of the center are set incrementally less than Ω in progressing from the reflecting surface at the center of the array out to the last light source at the second end.

21. The optical transformer of claim 20, wherein Ω is approximately 45°.

22. The optical transformer of claim 19, comprising an alignment fixture supporting said plurality of flat reflecting surfaces.

23. The optical transformer of claim 18, comprising:
   a fixture having a major surface, and a plurality of ledges extending progressively outwardly from the major surface and having respective widths, and oriented at respective angles such that the plurality of ledges define planes that intersect at a line; and
   a plurality of mirror elements comprising respective pieces flat on one major side, having on a first edge respective ones of flat reflecting surfaces in the plurality of flat reflecting surfaces, and having a second edge arranged at a particular angle with respect to the first edge, the plurality of mirror elements mounted on the fixture so that each has its respective second edge on one of the plurality of ledges, a first mirror element has its major side against the major surface of the fixture, and successive mirror elements in the plurality of mirror elements has its respective major side parallel with the major side of the first mirror element, the respective angles of the plurality of ledges arranged so that the flat reflecting surfaces on the first edges are oriented at said respective angles δ with respect to the x-z plane.

24. The optical transformer of claim 23, wherein the particular angle is 45°.

25. The optical transformer of claim 23 wherein the plurality of mirror elements comprise essentially identical pieces.

26. The optical transformer of claim 23 wherein the plurality of mirror elements comprise essentially identical pieces.

27. An optical transformer, comprising:
   a fixture having a major surface, and a plurality of ledges extending progressively outwardly from the major surface and having respective widths, and oriented at respective angles such that the plurality of ledges define planes that intersect at a line; and
   a plurality of mirror elements comprising respective pieces flat on one major side, having on a first edge respective ones of flat reflecting surfaces in the plurality of flat reflecting surfaces, and having a second edge arranged at a particular angle with respect to the first edge, the plurality of mirror elements mounted on the fixture so that each has its respective second edge on one of the plurality of ledges, a first mirror element has its major side against the major surface of the fixture, and successive mirror elements in the plurality of mirror elements has its respective major side parallel with the major side of the first mirror element, the respective angles of the plurality of ledges arranged so that the flat reflecting surfaces on the first edges are oriented at said respective angles $\delta$ with respect to the x-z plane.

* * * * *